(12) United States Patent
Schmidt et al.

(10) Patent No.: US 7,233,256 B2
(45) Date of Patent: Jun. 19, 2007

(54) SYSTEM AND METHOD FOR RECEIVING A SIGNAL TO TRIGGER A PYROELECTRIC ACTIVATION SYSTEM

(75) Inventors: Frank Schmidt, Zorneding (DE); Martin Vossiek, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 10/497,176

(22) PCT Filed: Nov. 19, 2002

(86) PCT No.: PCT/DE02/04262

§ 371 (c)(1),
(2), (4) Date: Jan. 6, 2005

(87) PCT Pub. No.: WO03/049305

PCT Pub. Date: Jun. 12, 2003

(65) Prior Publication Data

US 2005/0116812 A1    Jun. 2, 2005

(30) Foreign Application Priority Data

Nov. 29, 2001   (DE) ................................ 101 58 615

(51) Int. Cl.
*G08C 19/00*   (2006.01)

(52) U.S. Cl. ............................... 340/825.72; 340/10.34

(58) Field of Classification Search ............ 340/825.72, 340/870.3, 870.38, 538.15, 5.61
See application file for complete search history.

(56) References Cited

U.S. PATENT DOCUMENTS

| | | | |
|---|---|---|---|
| 5,583,819 A | * | 12/1996 | Roesner et al. .......... 340/10.51 |
| 6,375,780 B1 | * | 4/2002 | Tuttle et al. ................. 156/226 |
| 6,452,494 B1 | * | 9/2002 | Harrison ................... 340/545.4 |
| 6,459,376 B2 | * | 10/2002 | Trosper ...................... 340/571 |
| 2002/0021216 A1 | | 2/2002 | Knauer et al. |

FOREIGN PATENT DOCUMENTS

| | | |
|---|---|---|
| DE | 34 20 509 | 12/1985 |
| DE | 34 39 283 | 4/1986 |
| DE | 197 31 219 | 1/1999 |
| DE | 199 01 351 | 7/2000 |
| EP | 0 467 036 | 1/1992 |
| WO | 00/43802 | 7/2000 |

* cited by examiner

*Primary Examiner*—Lynda Jasmin
*Assistant Examiner*—Yong Hang Jiang
(74) *Attorney, Agent, or Firm*—Young & Thompson

(57) ABSTRACT

Activation system includes a reception device for receiving an activation signal (SIGA), and an activation circuit (4) for activating an electric circuit (5). A pyroelectric element (3) is connected to the reception device (1) and to the activation circuit (4). The pyroelectric element can be heated by the activation signal (SIGA) in such a way that a voltage high enough to actuate the activation circuit (4) is produced in the pyroelectric element.

15 Claims, 2 Drawing Sheets

SYSTEM AND METHOD FOR RECEIVING A SIGNAL TO TRIGGER A PYROELECTRIC ACTIVATION SYSTEM

BACKGROUND OF THE INVENTION

The invention relates to an activation system, a remotely triggerable circuit system containing this system, and to respective operating methods.

Electric circuits, which are not connected to a power supply system, e.g. radio identity disks or radio access cards, tickets, etc. (smart cards) require extremely low energy consumption. Constant operation would very quickly drain the batteries.

The circuits are therefore conventionally maintained in a very power-saving, inactive state and only activated for short periods as required. Activation is effected to date by means of a radio signal, which is received in the battery-operated device, rectified and used for activation. Activation is then generally triggered when the rectified signal exceeds a defined threshold value.

One problem with this conventional method is the often inadequate range of the activation signals, which is due in particular to the low level of efficiency of rectifier diodes at low voltages. A further problem is that the activation system responds to all signals in a specific frequency range, including interference signals, as no "intelligence" has been prompted before activation—resulting in unwanted activation of the circuit and therefore premature draining of the batteries.

FIG. 3 outlines the principles of activation according to the prior art.

An activation transmitter ST1 sends an activation signal SIGA to a conventional activation system ST2. The activation system ST2 comprises a directly operating rectifying circuit, which rectifies the activation signal SIGA and uses it directly for its operation.

A device is known from WO 00/43802, with which radiation at the site of a coding element is converted using a converter to a secondary energy form, which is buffered. The stored secondary energy is then fed to a non-linear element, which is a spark discharge gap.

An ID tag is known from EP 0 467 036 A2, which is maintained by means of an activation or wake-up circuit at constant low output. The activation circuit is activated by a received signal, which is first analyzed by a microprocessor.

SUMMARY OF THE INVENTION

An object of the present invention is to provide a possibility for activation of electric, in particular electronic circuits, which are signal-sensitive and not susceptible to interference signals.

The activation system comprises at least one receiving device for receiving an activation signal and at least one activation circuit for activating an electric circuit. The receiving device is a radio antenna, for example.

The activation system also comprises at least one pyroelectric element connected to the receiving device and the activation device. The pyroelectric element can be heated by means of the activation signal in such a way that a voltage high enough to actuate the activation circuit can be produced.

This activation system dispenses with the inefficient direct rectification of the received high-frequency activation signals. Rather the—preferably high-frequency—activation signal is first converted to heat. Thermal conversion is favorably effected by means of a special heating element, in particular by means of an ohmic resistance connected directly to the receiving device. The heat from this is transferred to the pyroelectric element and causes charge separation therein. The voltage resulting from the charge separation operates an activation circuit, which can in turn supply a prompt signal for a downstream electrical system, in particular for an electronic circuit. The activation circuit is preferably produced with ULP (Ultra Low Power) technology, so that it already operates with extremely low electrical output levels and is not a significant load on the battery.

An activation system is preferred, with which there are a plurality of signal converters of different coding, each comprising at least one heating resistor and at least one pyroelectric element. This means that different activation signals can activate different parts of the electrical or electronic system, thereby producing a variable reaction, e.g. a different data interrogation in each instance. Such coding is of particular significance, if it is to be possible to activate different electrical or electronic circuit systems separately and specifically.

The pyroelectric element preferably comprises a single crystal, a ceramic base material and/or a polymer. Suitable pyroelectric materials are for example ferroelectric crystals of the group triglycine sulfate (TGS) or lithium tantalate (LiTa03), yttrium barium copper oxide (YBCO), lead zirconate titanate (PZT) or polymers such as polyvinylidene difluoride (PVDF) as well as thin electroceramic or ferroelectric films, made for example from the above materials. These materials or combinations of materials are generally used in pyroelectric infrared detectors (pyro-detectors), bolometers or pyro-thermometers. The assembly techniques and materials generally used for these sensors can therefore be transferred to a large extent to favorable embodiments of the present activation system.

The object is also achieved by a remotely triggerable circuit system. This comprises at least one activation system and an electric circuit downstream from this. The electric circuit can be operated by means of at least one energy storage device, e.g. a battery, an accumulator or a capacitor.

It is particularly advantageous, if the remotely triggerable circuit system comprises at least one transmitter with a downstream transmission device. This can be used to send back stored data, e.g. for non-contact transit control, e.g. at a concert or in public transport. The activation system and transmitter can be connected to a shared transmission/receiving antenna or separate antennae. To reduce interference, it is advantageous if the receiving device and the transmission device use different frequencies from each other. A ferrite antenna in particular is suitable for the use of favorable, high-frequency field energy.

It is favorable for the activation system and for the remotely triggerable circuit system, if they are produced using thin film technology.

The object is also achieved by a method for operating the at least one activation system, with which a time-modulated activation signal is sent to the activation system, whereupon thermoelectric correlation is implemented in the signal converter based on the time modulation. Different actions by the activation system(s) can be triggered specifically in this way. Correlation here refers to a general method for carrying out a comparison of the signal pattern sent to the activation unit with a pattern stored in the activation unit, whereby this comparison is preferably effected directly at thermoelectric level. Correlation for example includes not just a correlation in the strict mathematical sense but also convolution or filtering processes, which are suitable for analyzing and comparing signals.

Correlation can also be used to improve the signal to noise ratio of the detected signal. The distance, for example, from which the activation unit can be activated, can be significantly increased by the correlation gain, e.g. by pulse compression. Activation signals with good correlation properties include for example the spread spectrum signals known from telecommunication, digital pseudo-random codes (e.g. Barker codes, M sequences, Gold or Golay sequences) as well as frequency-modulated signals, in particular linear frequency-modulated signals (chirps), etc.

The object is also achieved by a method for operating the remotely triggerable circuit system, with which a time-modulated activation signal is sent to this, thermoelectric correlation is implemented in the activation system based on the time modulation and selective activation of the electric circuit is implemented based on the thermoelectric correlation. Selective activation can be understood to mean activation of different parts of the electric circuit or activation of different electric circuits.

The object is also achieved by a signal converter, which comprises at least one heating resistor and at least one pyroelectric element, whereby the pyroelectric element can be heated by electromagnetic-thermal conversion of the activation signal in the heating resistor (conversion of the activation signal to heat) in such a way that a voltage high enough for example to actuate the activation circuit can be produced in this. For this the at least one heating resistor and the at least one pyroelectric element are arranged so that the activation signal can be filtered in such a way that an output aggregate signal of the at least one pyroelectric element represents a filtered image of the activation signal. It is advantageous if the activation unit comprises such a signal converter, particularly if the signal converter implements a signal pattern comparison in the form of a correlation.

BRIEF DESCRIPTION OF THE DRAWINGS

The activation system is shown schematically in further detail in the following exemplary embodiments, in which;

FIG. 3 outlines the principles of activation according to the prior art. An activation transmitter ST1 sends an activation signal SIGA to a conventional activation system ST2. The activation system ST2 comprises a directly operating rectifying circuit, which rectifies the activation signal SIGA and uses it directly for its operation.

FIG. 1 outlines the principles of a remotely triggerable circuit system S. In this exemplary embodiment an activation signal SIGA can be received via a receiving device 1 in the form of a transmission/receiving antenna ANT. A heating element 2 in the form of an ohmic heating resistor is connected directly to the receiving branch of the antenna ANT. The heating element 2 is attached so that when it heats up, a pyroelectric element 3 is also heated. The heating of the pyroelectric element 3 brings about charge separation in the element 3 and therefore a voltage signal. This voltage signal serves to operate an activation circuit 4. The activation circuit 4 starts up an electronic circuit 5, which can be operated by means of an energy storage device 6 in the form of a battery. A transmitter 7 is present as part of the electronic circuit 6 or as a separate component and its output signal is emitted via the transmission/receiving antenna ANT as the transmission device 8. Alternatively, a separate transmission device in the form of a transmission antenna 8' (shown with a broken line) can also be used.

Figure 1:
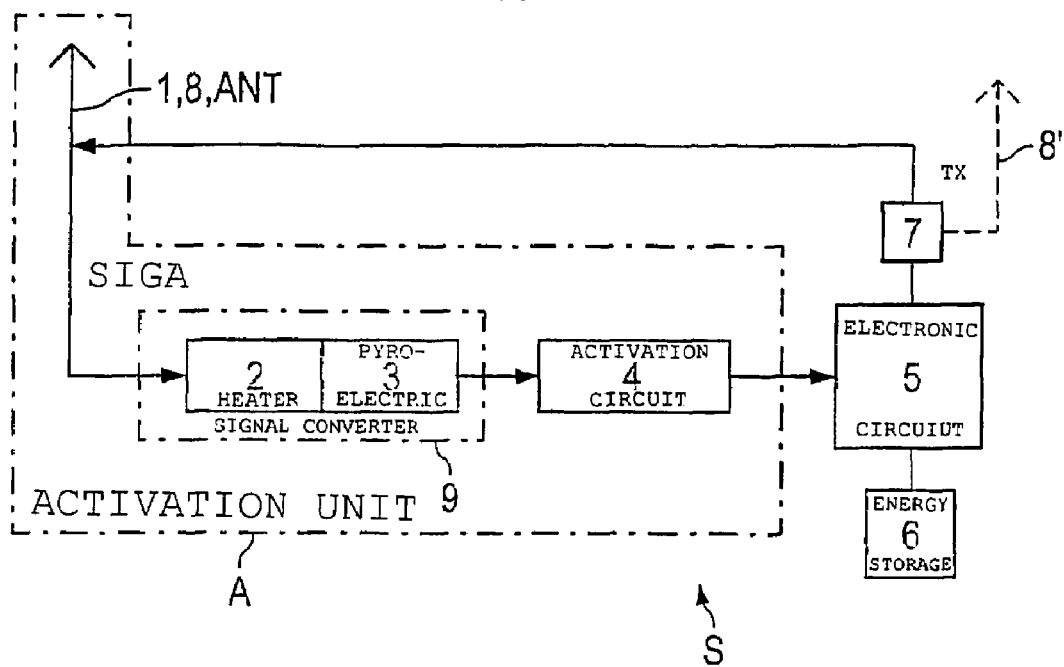
FIG. 1 shows a remotely triggerable circuit system.
Figure 3:
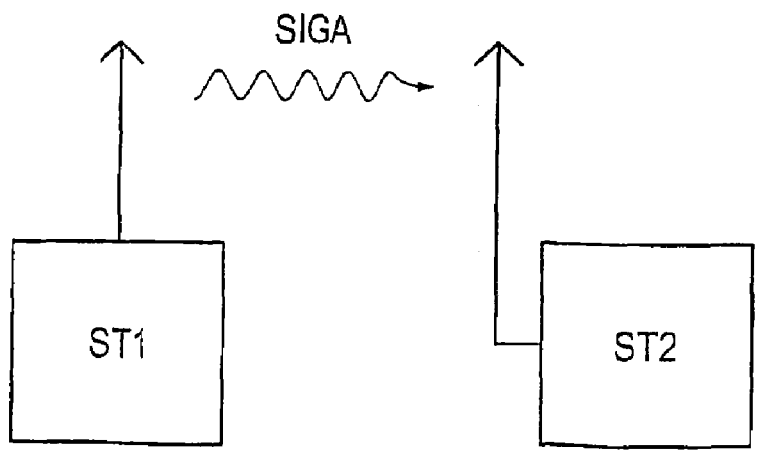
FIG. 3 shows radio activation of electronic components based on the prior art.

The activation unit A comprises the elements from the receiving device up to and including the activation system 4. The elements arranged between the receiving device 1 and activation unit 4 for converting the activation signal A to a voltage operating the activation element 4 can also be considered as parts of a signal converter 9; here this therefore covers the heating element 2 and the pyroelectric element 3.

Figure 2:
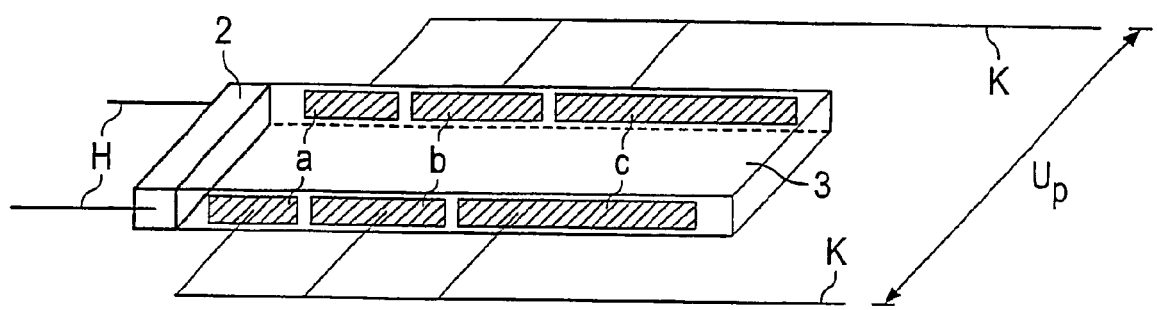
FIG. 2 shows an oblique view of a signal converter.

FIG. 2 shows an oblique view of a correlating signal converter 9.

It is often desirable to use an activation signal SIGA to activate only very specific parts of the electronic circuit 5 or only one or a plurality of very specific electronic circuits from a group of electronic circuits. This gives rise to the problem already referred to above that addressing must be undertaken, even before the circuits to be activated operate. This is the task of the signal converter 9 according to this exemplary embodiment. The signal converter 9 comprises an ohmic resistance 2, which is connected via supply wires H to the receiving device 1. An activation signal SIGA, favorably a radio signal, heats the resistance 2. A flow of heat is then propagated in the pyroelectric element 3, which has a good thermal coupling to the resistance 2. If a plurality of radio signals SIGA arrive quickly one after the other, this results in the superimposition of a plurality of heat propagation processes in the pyroelectric element 3.

Signal converter 9 also may comprise a plurality of electrode pairs a, b, c of different lengths, which are connected together via summing terminals K. An electric voltage Up occurs at each of the electrode pairs a, b, c due to the heating process and this voltage is proportional to the change over time of the temperature T between the electrode pairs a, b, c. A specific structure and a tailored thermal stimulus with a time-modulated activation signal SIGA can be used to ensure that only specific signal converters 9 emit an activation voltage to the summing terminals K even when there are a plurality of signal converters 9 present. In other words, thermoelectric correlation is implemented in the signal converter 9. When correlation is successful (activation signal SIGA and signal converter 9 match up), the components accumulate and activate the activation circuit 4.

The coding of the signal converter 9 is thereby determined by the geometry, number, connection and arrangement of the electrodes on the pyroelectric material. A plurality of signal components with different delays with in some cases different amplitude weighting can be combined for this purpose, as is usually the case for example with digital filters too. The layout of such filter/correlation structures is in principle known for example for surface wave filters, see for example "H. Matthews, Surface wave filters. Design, construction and use. Wiley, 1977". Electroacoustic coupling and acoustic wave propagation of the surface wave components should however be replaced for use in this activation system by thermoelectric coupling and the corresponding thermal propagation processes. A further significant difference in respect of surface wave components lies in the (approx. factor 1000) slower propagation speed of thermal waves compared with acoustic waves. The sizes or implementable filter frequency ranges are therefore scaled accordingly, which is a significant advantage for many applications.

The signal converter can also comprise a plurality of heating elements, i.e. a plurality of ohmic resistances for example and only one electrode pair or even a plurality of electrode pairs. To direct the heat flow, it is favorable to provide structures on the structural element, for example tracks with particularly good or poor conductivity, which ensure specific propagation of the heat flow from at least one heating element to at least one pyroelectric element with at least one electrode pair. Generally all variables, which influence signal conversion and propagation, can be used for coding, i.e. variations in geometric dimensions, propagation path lengths, coupling factors, masses, heat conductivity values, electrode pair size, etc.

Correlation should not only be used advantageously for the purposes of addressing but also to improve the signal to noise ratio of the detected signal. The distance from which the activation unit A in the receiving device can be activated by a transmitter station can be significantly increased by the correlation gain, which can be achieved for example by pulse compression. The principle of pulse compression and a theory and method for generating a good correlation gain are disclosed for example in "H. Matthews Surface wave filters. Design, construction and use, Wiley, 1977". A distinction is thereby frequently made between what is known as the Wiener filter method, the matched filter method or inverse filtering and deconvolution.

Activation signals with good correlation properties include for example the spread spectrum signals commonly used in communication, the known digital pseudo-random codes, i.e. Barker codes, M sequences, Gold or Golay sequences for example, as well as frequency-modulated signals, in particular linearly frequency-modulated signals (chirps), etc.

The use of differently coded signal converters 9 in the remotely triggerable circuit systems in each instance makes it possible to activate only specific remotely triggerable circuit systems from a larger number in a specific manner with one activation transmitter ST1 (shopping basket problem). Thermoelectric correlation also provides good protection against unwanted activation by high-frequency interference signals. The geometry of the structure shown schematically in this figure was chosen for clarity and can differ significantly from this in practice. The entire structure can in particular be manufactured by means of thin film methods on a support material for example, as a result of which the arrangement and geometry of all the subcomponents are different.

Generally one electrode pair is adequate to pick off the voltage at the pyroelectric element 3, but if there are a plurality of electrode pairs a, b, c, their lengths must not differ. The electrode pairs a, b, c can also be connected together differently. A plurality of heating elements can also be used.

The preferred use is in particular identification in the general sense, e.g. activation of electronic tickets in vehicles, at fairs, in access systems, electronic shelf labels or price labels (shopping basket), radio data transmissions to wireless sensor systems, radio identity disks on vehicles, goods, people, etc., systems operating in a stand-alone manner with regard to energy, access monitoring at computers via activation of a chip card, etc. or electronic check cards. The list of examples of applications is not complete and should only give an idea of the possibilities.

The invention claimed is:

1. An activation system, comprising
   a receiving device (1) for receiving an activation signal (SIGA);
   an activation circuit (4) for activating an electric circuit (5); and
   at least one pyroelectric element (3) connected to the receiving device (1) and the activation circuit (4), said at least one pyroelectric element producing a voltage that actuates said activation circuit (4) when heated by the activation signal from said receiving device.

2. The activation system according to claim 1, further comprising at least one heating resistor (2) connected downstream from the receiving device (1) to heat said at least one pyroelectric element (3).

3. The activation system according to claim 2, comprising a plurality of signal converters (9) of different codings, each of which comprises at least one said heating resistor (2) and at least one said pyroelectric element (3).

4. The activation system according to claim 3, wherein the codings are determined by arrangements of electrodes on the respective pyroelectric element (3).

5. The activation system according to claim 3, wherein each said pyroelectric element includes a plurality of electrodes and wherein thermoelectric correlation is implemented between the activation signal (SIGA) and the voltage by means of the electrodes when charged by the pyroelectric element (3), as a result of which a correlation gain is generated.

6. The activation circuit according to claim 5, wherein the correlation gain is defined by the codings.

7. The activation system according to claim 5, wherein the correlation gain is generated by pulse compression.

8. The activation circuit according to claim 3, wherein addressing of the electric circuit (5) is defined by the codings.

9. The activation circuit according to claim 1, further comprising an energy storage device for operating the electric circuit (5).

10. The activation circuit according to claim 9, wherein the electric circuit comprises at least one transmitter (7) with a downstream transmission device (8).

11. The activation circuit according to claim 10, wherein the receiving device (1) and the transmission device (8) use different frequencies from each other.

12. A method of operating an activation system that includes a receiver for receiving an activation signal, an activation circuit for activating an electric circuit, and a pyroelectric element connected to the receiver and to the activation circuit, the method comprising the steps of heating the pyroelectric element with the activation signal from the receiver, the heated pyroelectric element producing a voltage that actuates the activation circuit.

13. The method of claim 12, further comprising the step of heating a resistor with the activation signal, wherein heat from the resistor heats the pyroelectric element.

14. The method of claim 12, wherein the activation system includes a plurality of the pyroelectic elements that each have a respective arrangement of electrodes thereon that define different codings, the method further comprising the step of selectively heating the pyroelectric elements based on the different codings.

15. The method of claim 12, wherein the activation system includes a plurality of the pyroelectic elements that each have a respective arrangement of electrodes thereon and wherein the activation signal is time modulated, the method further comprising the step of selectively heating the pyroelectric elements based on the time modulated activation signal.

* * * * *